United States Patent [19]

Muench

[11] 4,248,358

[45] Feb. 3, 1981

[54] QUALITY-PRESERVING HOT-FOOD DISPENSER

[76] Inventor: Thomas B. Muench, R.R. #2, Box 198, Waverly, Ill. 62692

[21] Appl. No.: 32,261

[22] Filed: Apr. 23, 1979

[51] Int. Cl.[3] .............................................. A47J 36/26

[52] U.S. Cl. ................................................ 221/150 A

[58] Field of Search ........ 221/150 R, 150 HC, 150 A, 221/98, 99, 100, 107, 201, 202, 203, 124

[56] References Cited

U.S. PATENT DOCUMENTS 3,653,541 4/1972 Crum ............................ 221/150 HC

*Primary Examiner*—Stanley H. Tollberg

*Attorney, Agent, or Firm*—Ralph F. Staubly

[57] ABSTRACT

A coin-controlled dispenser for heated cans of food or beverage has separate heat-insulated chutes for holding cans of different commodities. Each chute is divided by a heat-barrier into an upper unheated storage section and a lower can-heating section. Coin-controlled apparatus of known construction releases the lowermost one of several cans from the lower heating section and substantially simultaneously releases the lowermost can from the upper unheated storage section to maintain in the heating section only the number of cans desired to be therein in anticipation of daily sales, whereby the quality of the heated commodities will be protected against quality-lowering prolonged heating.

7 Claims, 2 Drawing Figures

QUALITY-PRESERVING HOT-FOOD DISPENSER

BACKGROUND AND OBJECTS OF THE INVENTION

Coin-controlled dispensers for serving hot food and/or beverages in sealed containers are old. It is also known that holding the contents of the sealed containers at serving temperatures for prolonged periods (e.g. a few days) greatly lowers the quality of the served commodity. It is therefore the object of the present invention to provide dispensers of this type in which each supply chute is divided into a lower heated section and an upper unheated storage section in which the number of containers in each heated section can be preselected and then maintained by mechanism that, when it dispenses a heated container, acts to simultaneously substitute a cool one therefor. Other objects and advantages will become apparent as the following description proceeds.

BRIEF DESCRIPTION OF THE DRAWING FIGURES

DETAILED DESCRIPTION

Figure 1:
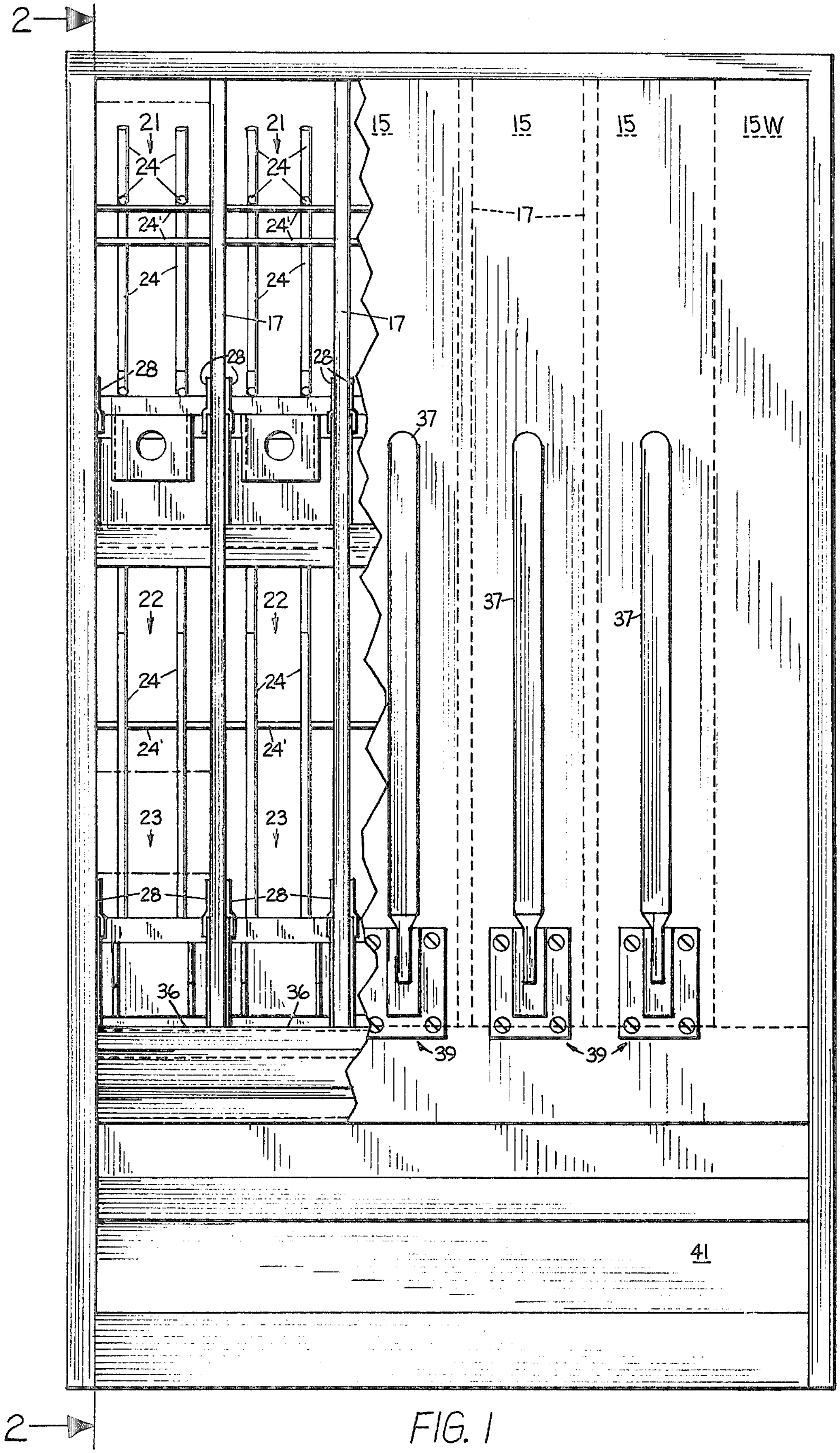
FIG. 1 is a front elevational view, partly broken away, of a preferred embodiment of the invention.

With reference now to the drawings, the numeral 11 generally designates a sheet-metal housing, having a removable front panel 13 partly broken-away in FIG. 1. The housing 11 has a plurality of compartments 15 defined by vertical partitions 17, which may carry thin heat-insulating panels (not shown) over their lower extents. Compartment 15*w* is a wiring chase for holding conductors that supply power for a conventional metal-sheathed electric heater 19 and for any illuminating or advertising lamps (not shown).

Supported by the partitions 17, there are three chutes 21,22 and 23. The chutes are each formed of two parallel heavy wires 24. The upper chute 21 is of a size to hold as many cans C as is desired to avoid too frequent re-stocking. The chute 21 feeds cans for dropping singly into a drop-through receptacle 25 which slidably rests on a fixed plate 27. Heat-insulating sheet 29, and sheet 31 on the rear surface of the receptacle 25, and sheet 33 underlying the fixed slide-plate 27 together constitute the thermal barrier that divides the compartment 15 into an upper unheated storage section and a lower can-heating section.

The two chutes 22 and 23 direct cans through the can-heating section for dropping singly into another drop-through receptacle 35, which slidably rests upon a plate 36 and dispenses the purchased can.

The two receptacles 25 and 35 are interconnected for simultaneous inward sliding movement by a rigid handle 37. The lower leg of the handle 37 is shown as being controlled by a coin-operated locking device 39 of known construction.

Figure 2:
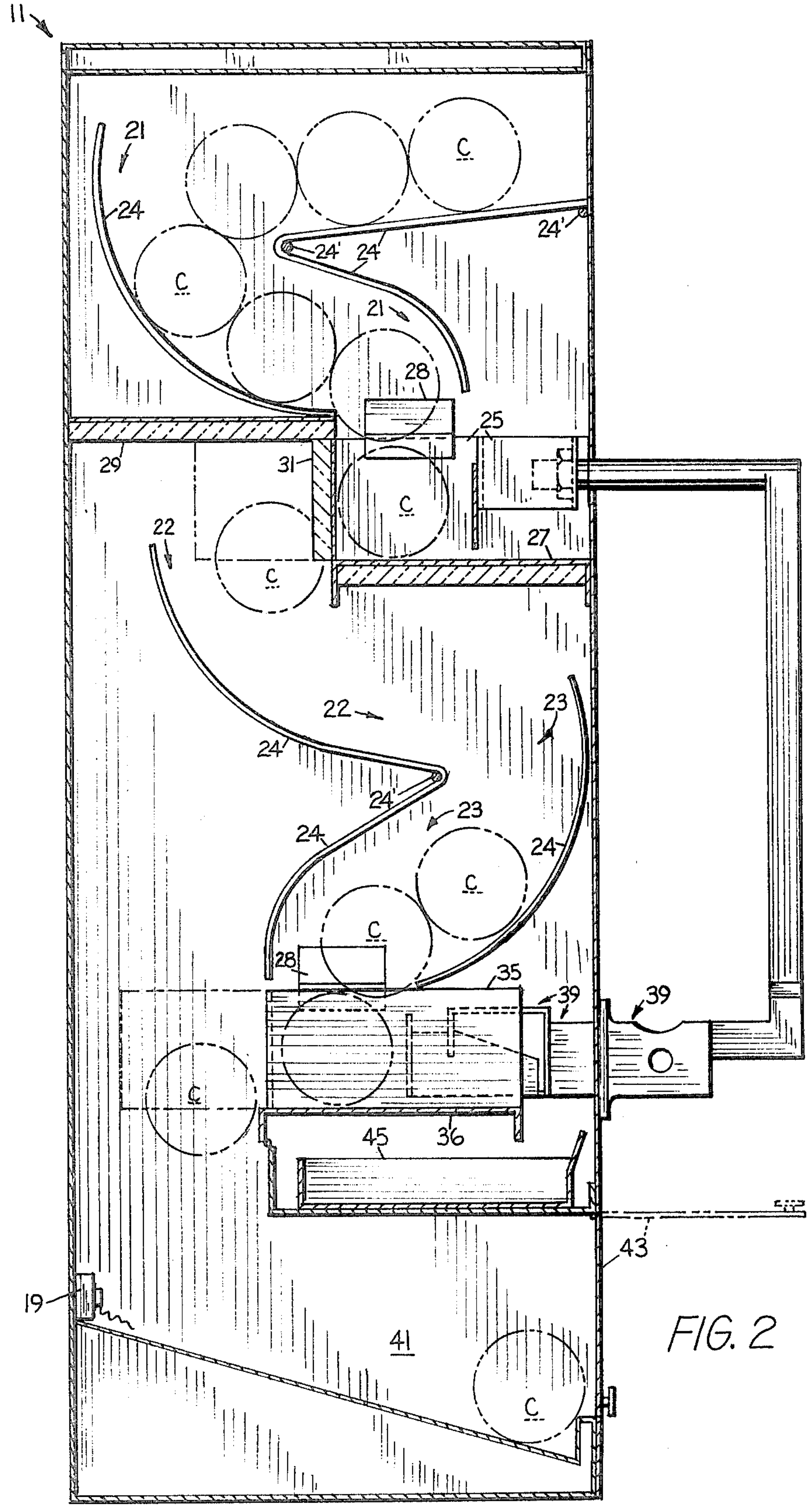
FIG. 2 is a side elevational view of the showing of FIG. 1 in section taken on the line 2—2 of FIG. 1.

When released by a coin the locking device 39 permits the handle 37 to be moved to the left in FIG. 2. This movement pushes the receptacles 25 and 35 to their phantom-shown positions in which each one will move one can for dropping from the rear edge of its support plate 27 or 36. The heated can will drop to the dispensing compartment 41 for removal by the customer after the heat-conserving glass door 43 is swung to its phantom-shown open position. Simultaneously the replacement unheated can will drop into the can-heating section of the compartment 15.

The front housing panel is provided with a key-operated lock (not shown) and is easily removed (or swung open) for adding cans, cleaning, repairing, and removing the coin-receiving pan 45.

The invention having been described, what is claimed is:

1. Apparatus for dispensing heated food or beverages in containers, comprising: housing means encasing at least one chute-like structure for holding a plurality of said containers, heat-insulating means dividing said chute-like structure into a lower heating section and an upper storage section, means for heating said lower section, dispensing means positioned adjacent the lower end of each section, and control means for substantially simultaneously dispensing a container from the lower section and releasing a container from the upper section for movement into the lower section, to maintain in the heating section only the number of containers desired to be therein in anticipation of the expected short-time sales volume, whereby the quality of the heated commodity will be protected against quality-lowering prolonged heating.

2. Apparatus according to claim 1 wherein said control means is coin-operated.

3. Apparatus according to claim 2 wherein said housing is divided by vertical partitions into a plurality of chute-containing compartments each holding a plurality of containers holding the same commodity.

4. Apparatus according to claim 3 wherein the lower portions of said partitions are heat-insulated.

5. Apparatus according to claim 2 wherein said dispensing means and said control means are each a receptacle with open top and bottom for drop-through feeding of containers, said bottom being normally closed by a short fixed horizontal plate and said receptacle being slidable beyond the rear edge of said plate for effecting the drop-through action.

6. Apparatus according to claim 5 wherein said receptacles are interconnected by a rigid U-shaped handle the bight portion of which is external to said housing.

7. Apparatus according to claim 6 wherein said heat-insulating means comprises an insulating sheet under the upper horizontal plate and another one on the rear wall of the upper receptacle.

* * * * *